US 9,483,553 B2

(12) United States Patent
Chilakamarri et al.

(10) Patent No.: US 9,483,553 B2
(45) Date of Patent: Nov. 1, 2016

(54) SYSTEM AND METHOD FOR IDENTIFYING RELATED ELEMENTS WITH RESPECT TO A QUERY IN A REPOSITORY

(71) Applicant: Tata Consultancy Services Limited, Mumbai (IN)

(72) Inventors: Srikar Chilakamarri, Hyderabaad (IN); Chalasani Rishitha, Hyderabad (IN)

(73) Assignee: Tata Consultancy Services Limited (IN)

( * ) Notice: Subject to any disclaimer, the term of this patent is extended or adjusted under 35 U.S.C. 154(b) by 263 days.

(21) Appl. No.: 14/214,539

(22) Filed: Mar. 14, 2014

(65) Prior Publication Data
US 2015/0199359 A1    Jul. 16, 2015

(30) Foreign Application Priority Data

Jan. 14, 2014    (IN) ............................ 119/MUM/2014

(51) Int. Cl.
*G06F 17/30* (2006.01)
*G06N 5/02* (2006.01)

(52) U.S. Cl.
CPC ......... *G06F 17/30731* (2013.01); *G06N 5/022* (2013.01)

(58) Field of Classification Search
CPC ............... G06F 17/30731; G06F 17/30424; G06F 17/30439; G06F 17/30448; G06F 17/30657; G06F 17/30663
USPC ................ 707/728, 758, 759, 765, 766, 769
See application file for complete search history.

(56) References Cited

U.S. PATENT DOCUMENTS 5,297,042 A    3/1994    Morita
5,576,954 A    11/1996    Driscoll et al.
(Continued)

OTHER PUBLICATIONS

Ingolf Geist, "Keyword Search across Distributed Heterogeneous Structured Data Sources" Dissertation, Otto-von-Guericke-Universitat, Magdeburg (Sep. 2012).
(Continued)

*Primary Examiner* — Hares Jami
(74) *Attorney, Agent, or Firm* — Finnegan, Henderson, Farabow, Garrett & Dunner, LLP (57) ABSTRACT

In one embodiment, a method is disclosed, comprising: receiving a query comprising at least one unrecognized element in a repository; mapping the query with a plurality of knowledge references to identify one or more words comprising one or more elements related to the unrecognized element of the query; identifying the relationship of the unrecognized element and the words, wherein the relationship is derived using a parent and sibling relationship; determining, by the one or more hardware processors, a number of occurrences of the one or more elements related to the unrecognized element; assigning, by the one or more hardware processors, a weight to an element from the one or more elements, wherein the one or more elements are related to the unrecognized element based upon the number of occurrences; and determining, by the one or more hardware processors, a relevance of the query using the weight assigned to the element.

11 Claims, 7 Drawing Sheets

(56) References Cited

U.S. PATENT DOCUMENTS

| | | |
|---|---|---|
| 5,991,755 A | 11/1999 | Noguchi et al. |
| 6,947,920 B2 | 9/2005 | Alpha |
| 7,181,451 B2 | 2/2007 | Dehlinger et al. |
| 7,840,569 B2 | 11/2010 | Meyerzon et al. |
| 8,280,882 B2 | 10/2012 | Troy et al. |
| 8,868,590 B1* | 10/2014 | Donneau-Golencer ............ G06F 17/3053 707/733 |
| 2008/0243486 A1* | 10/2008 | Summitt ............. G06F 17/2735 704/10 |
| 2012/0117082 A1* | 5/2012 | Koperda ............ G06F 17/3053 707/748 |
| 2012/0284308 A1* | 11/2012 | Paduroiu ............... G06F 17/273 707/780 |
| 2013/0151538 A1* | 6/2013 | Dmitriev ........... G06F 17/30616 707/750 |

OTHER PUBLICATIONS

Zhao Yuming et al., "Document relevance calculation based on Lexical cohesion with structure analysis," Journal of Chinese Language and Computing, vol. 18, iss. 3, pp. 93-105 (2008).

WAIS Inc., "How to Search a WAIS Database," http://town.hall.org/util/wais_help.html (Jan. 17, 1999) (earliest known date).

* cited by examiner

SYSTEM AND METHOD FOR IDENTIFYING RELATED ELEMENTS WITH RESPECT TO A QUERY IN A REPOSITORY

PRIORITY CLAIM

This U.S. patent application claims priority under 35 U.S.C. §119 to India Application No. 119/MUM/2014, filed Jan. 14, 2014. The aforementioned application is incorporated herein by reference in its entirety.

TECHNICAL FIELD

The present disclosure in general relates to identifying a relationship of an unrecognized element in a repository. More particularly, the present disclosure relates to systems and methods for identifying the relationship of an unrecognized element with respect to the query in a repository.

BACKGROUND

Many enterprises generate and store information relating to all facets of the organization. The information is often stored in documents, or a data warehouse, or a database, or a repository. The vast amount of information stored may result in difficulty while searching relevant document identifying the relevance of an element in the repository.

Existing techniques involve analysis of a reference document that matches with other documents while searching the database. One such methodology involves extraction of reference words and mapping of the reference words with results stored in the database. At least one word may be extracted from the reference document and may be compared with the selected set of words between documents that may be unknown. Identification of words in a document may include determination of number of occurrences of the words in the document and comparing the words with the query. Results may be retrieved based occurrence of the identified words. Retrieved results may not be satisfactory when the word list of the reference document is compared against the word list of the unknown document.

SUMMARY

Before the present systems and methods, enablement are described, it is to be understood that this disclosure is not limited to the particular platforms, systems, and methodologies described, as there can be multiple possible embodiments of the present disclosure and which are not expressly illustrated in the present disclosures. It is also to be understood that the terminology used in the description is for the purpose of describing the particular versions or embodiments only, and is not intended to limit the scope of the present disclosure.

In one implementation, a method for identifying a relationship of an unrecognized element with respect to a query in a repository is disclosed. The method comprises receiving the query comprising at least one unrecognized element in the repository. The method further comprises mapping, by one or more hardware processor, the query with a plurality of knowledge references to identify one or more words comprising one or more elements related to the unrecognized element of the query. The method further comprises identifying, by the one or more hardware processors, the relationship of the unrecognized element and the words. The relationship is derived using a parent and sibling relationship. The method further comprises determining, by the one or more hardware processors, a number of occurrences of the one or more elements related to the unrecognized element. The method further comprises assigning, by the one or more hardware processors, a weight to an element from the one or more elements. The one or more elements are related to the unrecognized element based upon the number of occurrences. The method further comprises determining, by the one or more hardware processors, a relevance of the query using the weight assigned to the element.

In one implementation, a system for identifying a relationship of an unrecognized element with respect to a query in a repository is disclosed. The system comprises one or more hardware processors and one or more memory units coupled to the one or more hardware processors. The one or more hardware processors executes a plurality of modules stored in the one or more memory units. The plurality of modules comprises a reception module to receive the query comprising at least one unrecognized element in the repository. The plurality of modules further comprises a mapping module to map the query with a plurality of knowledge references to identify one or more words comprising one or more elements related to the unrecognized element of the query. The mapping module further identifies the relationship of the unrecognized element and the one or more words. The relationship is derived using a parent and sibling relationship. The mapping module further determines a number of occurrences of the one or more elements related to the unrecognized element. The plurality of modules further comprises an assigning module to assign a weight to an element from the one or more elements based upon the number of occurrences. The assigning module further determines a relevance of the query using the weight assigned to the element. The plurality of modules further comprises a retrieving module to retrieve the one or more elements in a hierarchical manner based on the relevance.

In one implementation, a non-transitory computer readable medium embodying a program executable in a computing device for identifying a relationship of an unrecognized element with respect to a query in a repository is disclosed. The program comprises a program code for receiving the query comprising at least one unrecognized element in the repository. The program further comprises a program code for mapping the query with a plurality of knowledge references in the repository to identify one or more words comprising one or more elements related to the unrecognized element of the query. The program further comprises a program code for identifying the relationship of the unrecognized element and the one or more words. The relationship is derived using a parent and sibling relationship. The program further comprises a program code for determining a number of occurrences of the one or more elements related to the unrecognized element. The program further comprises a program code for assigning a weight to an element from the one or more elements related to the unrecognized element based upon the number of occurrences. The program further comprises a program code for determining a relevance of the query using the weightage assigned to the element.

BRIEF DESCRIPTION OF THE DRAWINGS

The foregoing summary, as well as the following detailed description of preferred embodiments, is better understood when read in conjunction with the appended drawing. For the purpose of illustrating the disclosure, there is shown in the drawing an exemplary construction of the disclosure, however, the disclosure is not limited to the specific methods and system illustrated.

DETAILED DESCRIPTION

The present disclosure relates to systems and methods to identify a relationship of an unrecognized element with respect to a query. The query may be received from a user operating a computing device. The query may be mapped with plurality of knowledge references in order to identify one or more words associated with the query. The one or more words comprise one or more elements related to the unrecognized element of the query. Further, the relationship of the unrecognized element and the one or more words may be identified using parent and sibling relationship. Number of occurrences of the one or more elements related to the unrecognized element of the query may be determined by grouping the occurrences. An element from the one or more elements may be assigned a weightage based on the occurrences of the one or more elements. Relevancy of the query may be determined using a mathematical derivation/probability determination based on the weightage of each of the element.

While aspects of described system and method for identifying a relationship of an unrecognized element with respect to a query in a repository may be implemented in any number of different computing systems, environments, and/or configurations, the embodiments are described in the context of the following exemplary system.

Figure 1:
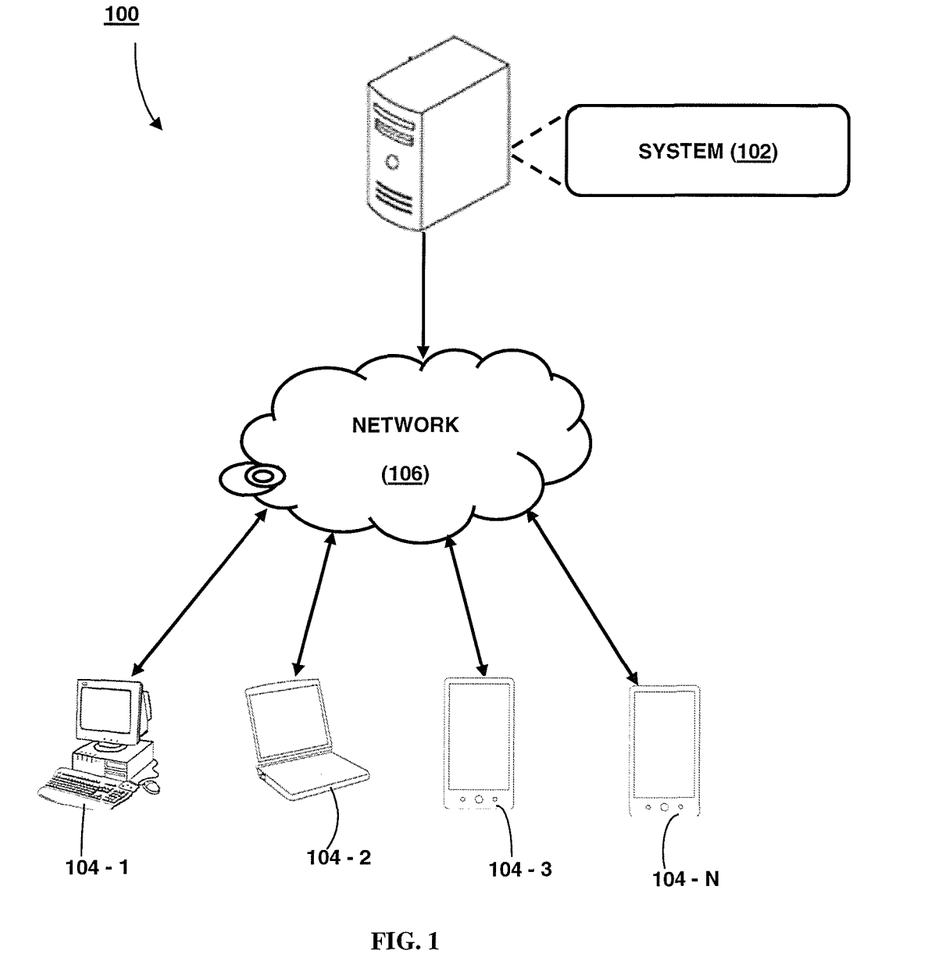
FIG. 1 illustrates a network implementation of system(s) for identifying a relationship of an unrecognized element with respect to a query in a repository, in accordance with an embodiment of the present disclosure.

Referring now to FIG. 1, a network implementation 100 of a system 102 for identifying a relationship of an unrecognized element with respect to a query in a repository is illustrated, in accordance with an embodiment of the present disclosure.

Although the present disclosure is explained by considering a scenario that the system 102 is implemented as an application on a server. It may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
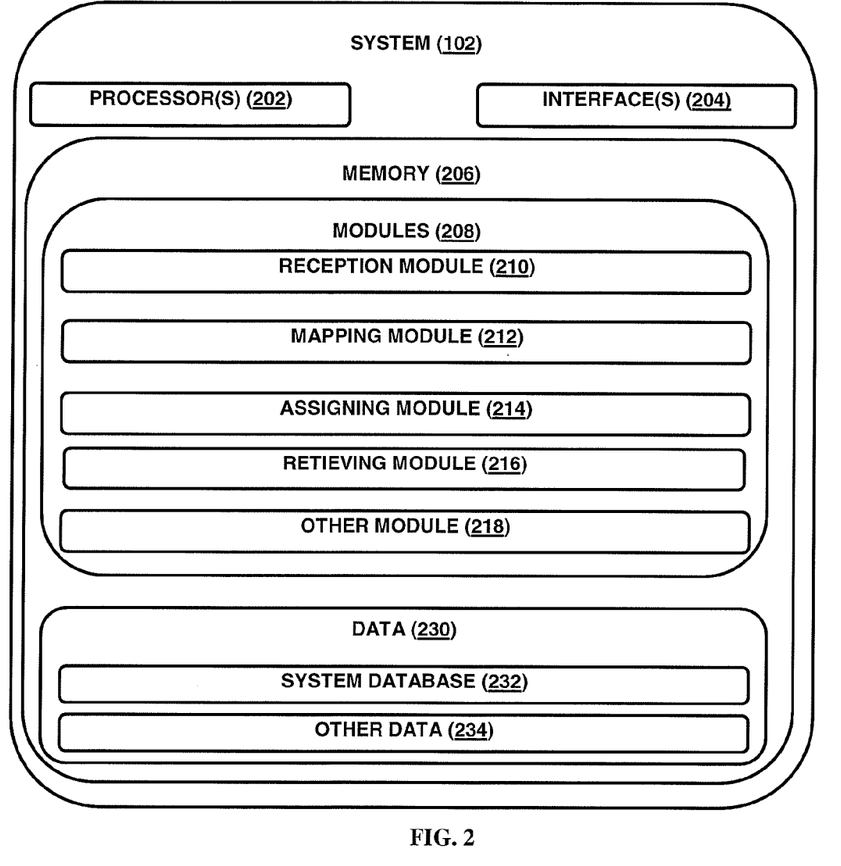
FIG. 2 illustrates the system(s), in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, etc., which perform particular tasks or implement particular abstract data types. In one implementation, the modules 208 may include a reception module 210, a mapping module 212, an assigning module 214, a retrieving module 216, and other modules 218. The other modules 218 may include programs or coded instructions that supplement applications and functions of the system 102. The data 230, amongst other things, serves as a repository for storing data processed, received, and generated by one or more of the modules 208. The data 230 may also include a system database 232 and other data 234. The other data 234 may include data generated as a result of the execution of one or more modules in the other modules 218.

In one embodiment, referring to FIG. 2, the reception module 210 may be configured to receive the query from a user. The query may be received through the interface 204. The query may comprise at lease one of a recognized element or an unrecognized element in the repository. The query may comprise one or more elements. The elements may include but not limited to phrase, sentence data definition, or a combination thereof. The element in the repository may be lowest granular data point that may be present in the repository. Further the element may be a word in a document, data value/definition in a database or description of a knowledge component in the repository. In one embodiment, the query may comprise at least one of the recognized element or at least one of the unrecognized element or a combination of thereof that may be present in the repository. The data 230 may be stored in the form documents, or a data warehouse or a plurality of databases or a knowledge repository or a repository. The unrecognized element may comprise at least one of data definition or sentence or phrase or semantic unit or electronic document. Further, the recognized element may comprise at least one of data definition or sentence or phrase or semantic unit or electronic document.

The repository may comprise structured metadata structures or unstructured data stores or combination of both. The unstructured data stores may comprise document links, business reference documents, business glossary, technical reference, user manuals and product manuals. The unstructured data stores may comprise data other than described. The query may be a machine triggered or user inputted query with predefined set of parameters for the unrecognized element. In one embodiment, the user may provide the predefined set of parameters in order to narrow the query. The user may add the unrecognized element or the recognized element in the query to identify the relationship in the repository.

The predefined set of parameters may be used as supplement to the query in order to refine the search, to identify the relationship of the query in the repository. In one embodiment, the predefined parameters may be additional set of queries/words/sentences provided by the user to refine the search as per domain nomenclature. The predefined parameters may facilitate identifying the one or more elements by refining the query from language based search to domain terminology search. The query may be executed to identify a data definition or to extract relevant data from the repository. In one embodiment, the query may include but not limited to text within the documents or the repository such as a sentence, phrase and semantic unit in the repository.

In one embodiment, the mapping module 212 may be configured to map the query with plurality of knowledge references in the repository to identify a multitude of words associated with the query. The plurality of knowledge references may include but not limited to, word dictionaries, system specific dictionaries to locate the recognized elements or the unrecognized elements in the repository. The multitude of words may comprise a data definition, or a sentence, or a phrase, or a document in the repository. In one embodiment, the multitude of words may comprise one or more elements related to the unrecognized element of the query. The one or more elements may comprise a word, or a definition, or a phrase, or a sentence, or a document, or a semantic unit or an electronic document.

The query may be mapped by the mapping module 212 to identify the multitude of words associated with the query. Further, the mapping module 212 may be configured to identify the relationship of the query and the multitude of the words in the repository. The mapping module 212 may identify the relationship of the unrecognized element with respect to the query and the multitude of the words in the repository. The mapping module 212 may derive the relationship using a parent and sibling relationship. The query may be split into multiple elements and may be searched within the repository at a level of the query in the repository. The level of the query may be defined to narrow down the predefined set of parameters to limit the scope of the search. The level of the query may comprise a parent level or a child level or a sibling level. In one embodiment, the parent level, the child level or the sibling level may determine a hierarchy of the search used to identify the relationship of the query in the repository. In a case when the level of query is not mentioned, the whole repository may be considered for the search. In one embodiment, the user may specify the level of the query.

In one embodiment, the mapping module 212 may identify a sibling of the unrecognized element or recognized element of the query. The sibling may be defined as possible match that may be related for the query at the level specified by the user. The siblings may include but not be limited to word determination, synonyms, industry reference dictionaries and user input that might be used to identify the siblings.

The multitude of the words that may be related to the query may be identified from a reference content. The reference content may be obtained from the repository or from an external database. The reference content may comprise word dictionaries, system specific dictionaries to locate the recognized elements or the unrecognized elements in the repository, repository of the previous searches and other references that may be used to enhance the search.

At each of the level, the multitude of words may be segregated to identify the relationship of the query using the parent and sibling relationship. The level may be evaluated to verify the existence of the parent level or child level or both for the unrecognized element with respect to the query. For each of the multitude of words, the existence of a parent or a child or a child may be evaluated. The query may be received as an input and may be defined by scanning the repository. The unrecognized element and the recognized element may be scanned to identify relationship, if the relationship may be defined in the repository. The evaluation of parent or child relationship will be explained in greater detail with the help of an example below.

Figure 3:
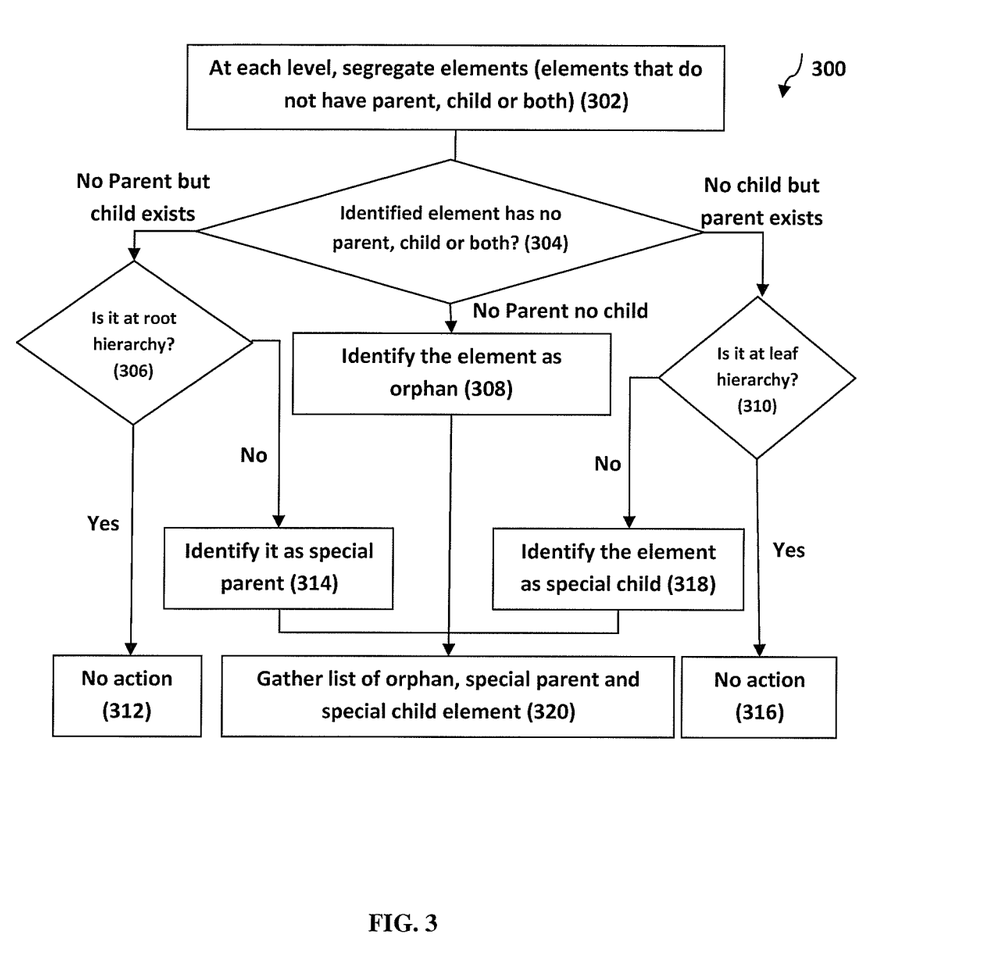
FIG. 3 illustrates the process of identifying unrecognized element in the repository, in accordance with an embodiment of the present disclosure.

In one embodiment, with reference to FIG. 3, a process 300 of identifying unrecognized element in the repository may be illustrated. The mapping module 212 may identify the sibling or the parent of the unrecognized element or recognized element of the query. The query may be split into multiple elements and may be searched within the repository at the level of the query in the repository. At step 302, in each of the level of hierarchy, the elements may be segregated in order to evaluate the existence of the patent or the child or both for the unrecognized elements from the query. At step 304, the elements of the query comprising the parent, the child or both may be identified. If the query element comprises the child but does not comprise the parent, the query element may be verified to check whether the query element is at a root hierarchy, as shown at step 306. If the query element is at the root hierarchy, then no action may be taken for the query element, as shown at step 312. If the query element is not present at the root hierarchy, then the query element may be identified as a special parent, as shown at step 314.

Still referring to FIG. 3, from the elements of the query identified, as shown at step 304, if the query element does not comprise either the parent or the child, then the query element may be identified as an orphan, as shown at 308. Further, from the elements of the query identified at step 304, if the query element comprise the parent but does not comprise the child, the query element may be verified to check whether the query element is at a leaf hierarchy, as shown at step 310. If the query element is at the leaf hierarchy, then no action may be taken for the query element, as shown at step 316. If the query element is not at the leaf hierarchy, then the query element may be identified as a special child, as shown at step 318. From step 308, step 314 and step 318, the orphan query element, the special parent query element and the special child query element may be gathered to form the unrecognized elements in the repository for the query, as shown at step 320.

Referring back to FIG. 3, for example, if the hierarchy in the repository may be defined as a Book class, an Author-Book, and a Shelf. For example, the author of the book is 'Gandhi'; the class of the book may be 'autobiography'. For the query, if the mapping module 212 identifies that the author 'Gandhi' is present, but with no book class, then the element may be identified as special parent element. For the above example, if the book does not have a value defined, then the element may be identified as the orphan element. In another example, if the class of the book may be defined as autobiography and there is no book defined, then the element may be defined as special child element.

In one embodiment, the mapping module 212 may be configured to determine a number of occurrences of the one or more elements related to the unrecognized element of the query. Further, determining may be associated with grouping of the occurrences of the one or more elements related to the unrecognized element of the query in the repository. The number of occurrences of the one or more elements related to the unrecognized element of the query may be determined by deriving relationship of the identified possible matched siblings in the repository. In one embodiment, the relationship of the identified possible matched siblings may further be subjected to extensive search based on linked objects, parents/child relationships, reference elements.

For each of the siblings identified, the parent element and the child element associated with the query in the repository may be identified. From the parent element and the child element identified, the number of occurrences of all the parent and child elements may be counted. Further, the parent elements and the child elements in respective classification may be assimilated. All the parent element and child element identified may be grouped independently by counting the occurrences of the respective the parent element and the child element. The occurrences of the one or more elements grouped related to the unrecognized element of the query in the repository, may be sorted based on the occurrences in the descending order. Determination of number of occurrences and grouping of the occurrences may be explained in greater detail in following description.

Figure 4:
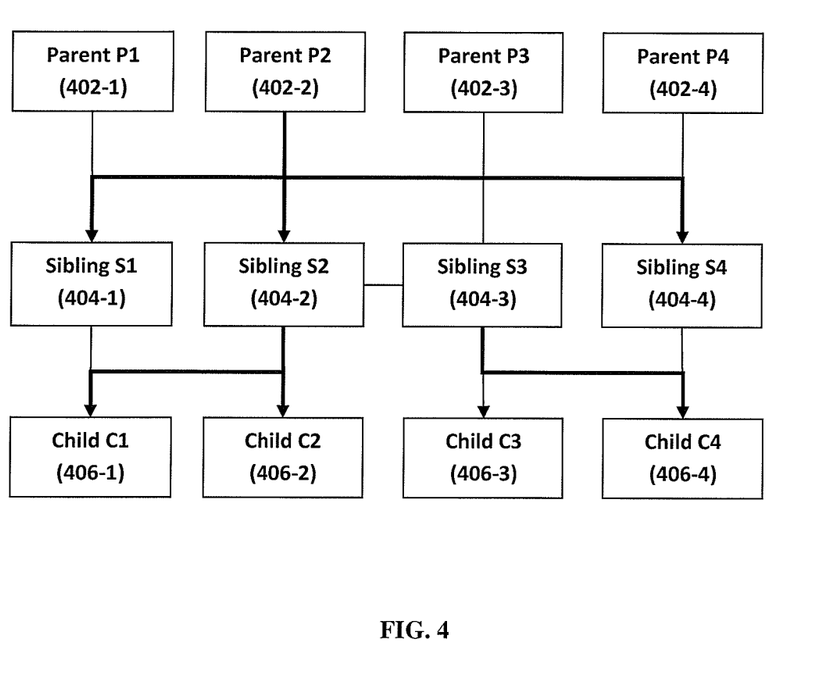
FIG. 4 and FIG. 5 illustrate identification of relationship of the identified possible matched siblings in the repository, in accordance with an embodiment of the present disclosure.

In one exemplary embodiment, identification of relationship of the identified possible matched siblings in the repository may be illustrated with reference to FIG. 4 and FIG. 5. Referring to FIG. 4, for each of the siblings identified, the parent 404-1, 404-2, 404-3 and 404-4, and the child 406-1, 406-2, 406-3, 406-4, associated with respect to the query in the repository may be identified. For example, from the parent element 402-1, 402-2, 402-3, 402-4 identified, and the child element 406-1, 406-2, 406-3, 406-4, identified, the number of occurrences of all the parent elements and the child elements may be counted. As shown in FIG. 4, the parent element 402-2, comprises highest occurrence and the child element 406-1, 406-2, and 406-4 comprises maximum occurrences followed by the parent element 402-3 and the child element 406-2.

Figure 5:
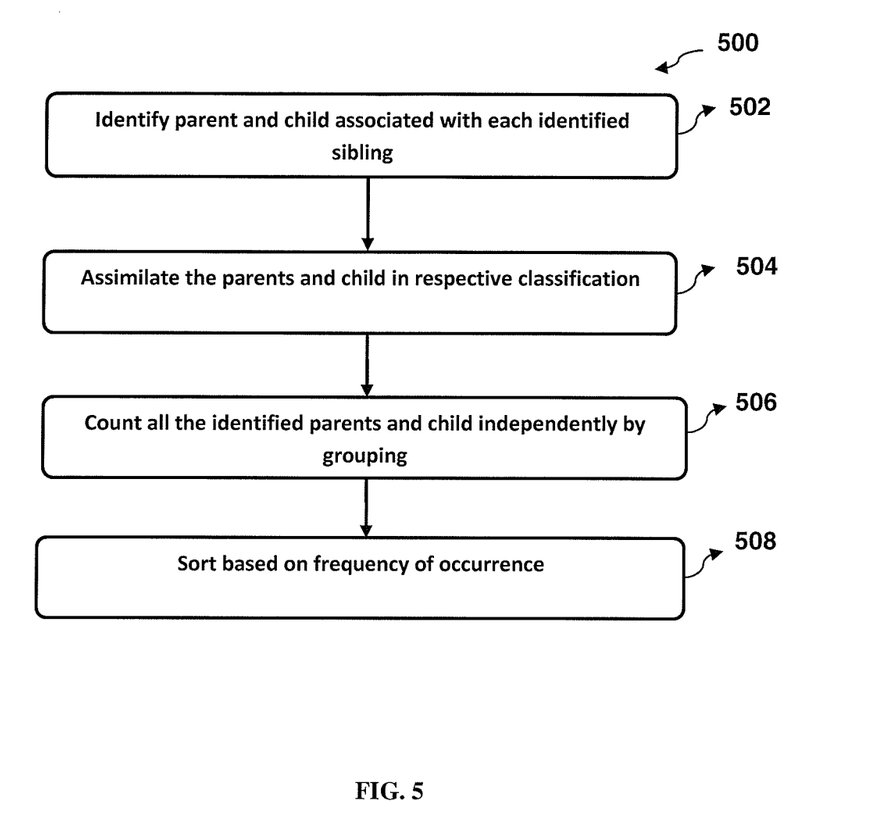

Similarly, referring to FIG. 5, a method 500 for identifying sibling relationship may be illustrated. The order in which the method 500 is described and is not intended to be construed as a limitation, and any number of the described method blocks can be combined in any order to implement the method 500 or alternate methods. Additionally, individual blocks may be deleted from the method 500 without departing from the spirit and scope of the disclosure described herein. At step 502, the mapping module 212 may identify the parent element and the child element associated with each sibling identified. At step 504, all the parent elements and the child elements in respective classification may be assimilated. At step 506, all the parent elements and the child elements identified may be grouped independently, by counting the occurrences of the parent elements and the child elements respectively. At step 508, identified relations of the siblings may be sorted based on the number of the occurrences in descending order. The sorting of the siblings based on the number of occurrences in ascending order is within the scope of the disclosure.

Considering the exemplary embodiment of FIG. 4 and FIG. 5, the identified siblings may be sorted as shown in Table 1.

TABLE 1

| Level | Name | Occurrence |
| --- | --- | --- |
| Parent | (402-2) | 3 |
| Parent | (402-3) | 2 |
| Child | (406-1) | 2 |
| Child | (406-2) | 2 |
| Child | (406-3) | 2 |
| Child | (406-4) | 1 |

The identified possible matched siblings may be further subjected to extensive search on the linked objects, parents/child relationships, reference elements as explained earlier. The parent elements and the child elements identified may be segregated to group based on number of occurrences. For example, If Gandhi as an author may be present in the repository and the related elements comprising 'Mandela' and 'Nehru'. Further, the book class for Nehru may comprise autobiography, independence, and Indian politics, and Mandela may comprise autobiography and independence. The mapping module 212 may search for all of the elements in the author. Upon identifying the elements, the mapping module 212 may search for the book class and book names. The mapping module 212 may identify that Nehru comprises autobiography, independence, Indian politics and Mandela comprises autobiography, independence in book class. The mapping module 212 may group the occurrences of autobiography and independence as 2 and Indian politics as 1.

A weightage may be assigned to an element from the one or more elements related to the unrecognized element based upon the number of occurrences by the assigning module 214. The occurrences determine the weight of the identified element for any given search. In one embodiment, the assigning module 214 may be configured to assign the weightage to the element from the one or more elements related to the unrecognized element based upon the number of occurrences. The weightage may be assigned in directly proportional to the number of occurrences of the one or more elements for a given query in the repository. Further, the assigning module 214 may be configured to determine relevancy of the query using a mathematical derivation/probability determination based on the weightage assigned to the element.

In one embodiment, the assigning module 214 calculates the frequency of occurrences the one or more elements related to the unrecognized element of the query in the repository. Further, the frequency of occurrences the one or more elements related to the unrecognized element of the query in the repository may be calculated in a descending order. In one embodiment, the retrieving module 216 may be configured to retrieve the one or more elements in a hierarchical manner based on relevancy.

The mathematical derivation/probability determination may be determined based on the weightage of each of the element. In one embodiment, the mathematical derivation/probability determination may be calculated as illustrated below:

Probability determination=((weightage of parent or child/Σ weightage of parent or child)/min (weightage of parent or child/Σ weightage of parent or child))

Considering above exemplary embodiment, FIG. 4 and Table 1, for the purpose of explaining the implementation of probability determination for the query, the probability determination based on the weightage of each of the element may be as follows.

TABLE 2

| Level | Name | Weightage | Weightage of parent or child/Σ weightage of parent or child | Probability determination |
|---|---|---|---|---|
| Parent | (402-2) | 3 | 0.428571429 | 3 |
| Parent | (402-3) | 2 | 0.285714286 | 2 |
| Parent | (402-1) | 1 | 0.142857143 | 1 |
| Parent | (402-4) | 1 | 0.142857143 | 1 |
| Parent total | | 7 | | |
| Child | (406-1) | 2 | 0.285714286 | 2 |
| Child | (406-2) | 2 | 0.285714286 | 2 |
| Child | (406-3) | 2 | 0.285714286 | 2 |
| Child | (406-4) | 1 | 0.142857143 | 1 |
| Child total | | 7 | | |

For the above example, determining the mathematical derivation/probability distribution based on the occurrences of the parent element 402-2, the probability determination may be calculated as follows:

Probability determination=((weightage of parent/Σ weightage of parent or child)/min (weightage of child/Σ weightage of parent or child))

Probability determination=((3/7)/(1/7)). Therefore, the probability distribution for the parent element 402-2 is 3 as shown in Table 2.

Figure 6:
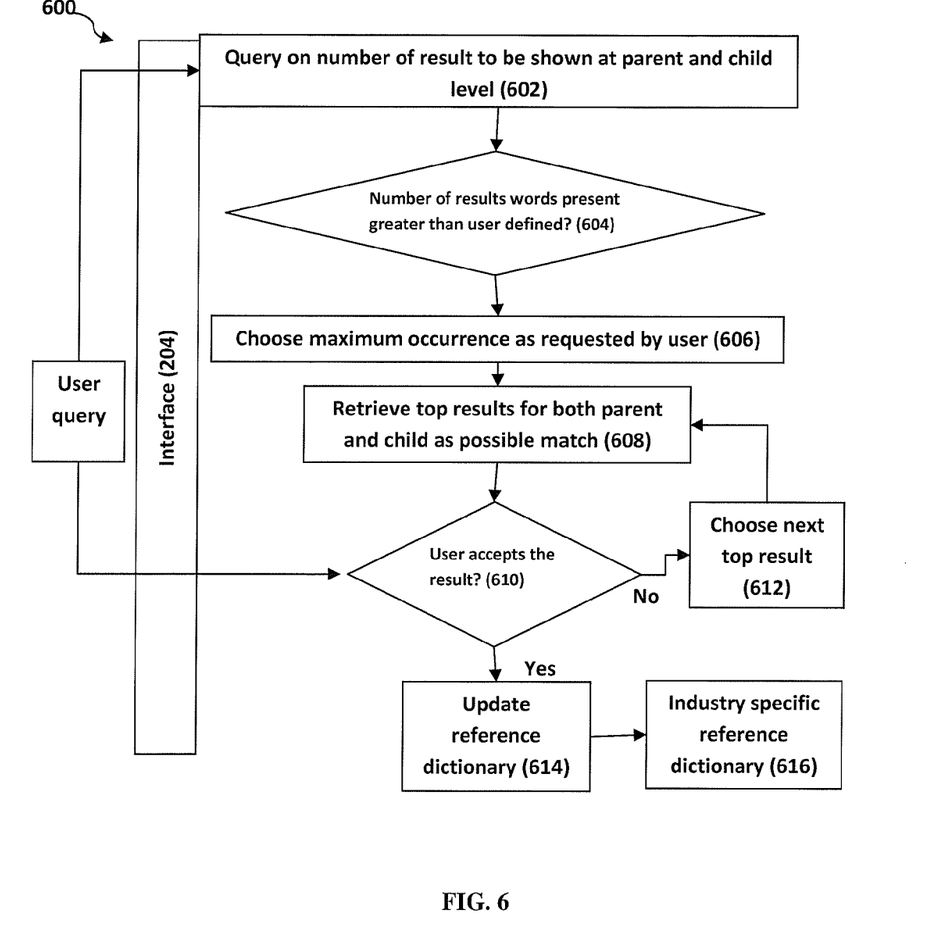
FIG. 6 illustrates a method for user to configure the results shown on the user interface, in accordance with an embodiment of the present disclosure.

In one embodiment, a method 600 to configure the results shown on the I/O interface 204 is illustrated in FIG. 6. In one implementation, the user may configure the results shown on the I/O interface 204. The order in which the method 600 is described and is not intended to be construed as a limitation, and any number of the described method blocks can be combined in any order to implement the method 600 or alternate methods. Additionally, individual blocks may be deleted from the method 600 without departing from the spirit and scope of the disclosure described herein.

At step 602, the user may input the query on number of results to be shown at the parent level or at the child level. The user may determine if the number of results and the elements present are greater than the user defined, as shown at step 604. The system 102 may present maximum occurrence as requested by the user, at step 606. The system 102 may retrieve the top results for both the parent element and the child element as possible match to the query as defined by the user, as shown at step 608. The user may accept the results presented by the system 102 on interface 204, as shown at step 610. If the user does not accept the results presented by the system 102, the system 102 may choose the next top result and present to the user, as shown at step 612. After step 612, the method 600 may further comprise performing the step 608. Further, if the user accepts the results, then the reference content may be updated as shown at step 614. The reference content may be updated as an industry specific reference dictionary as shown at step 616.

Figure 7:
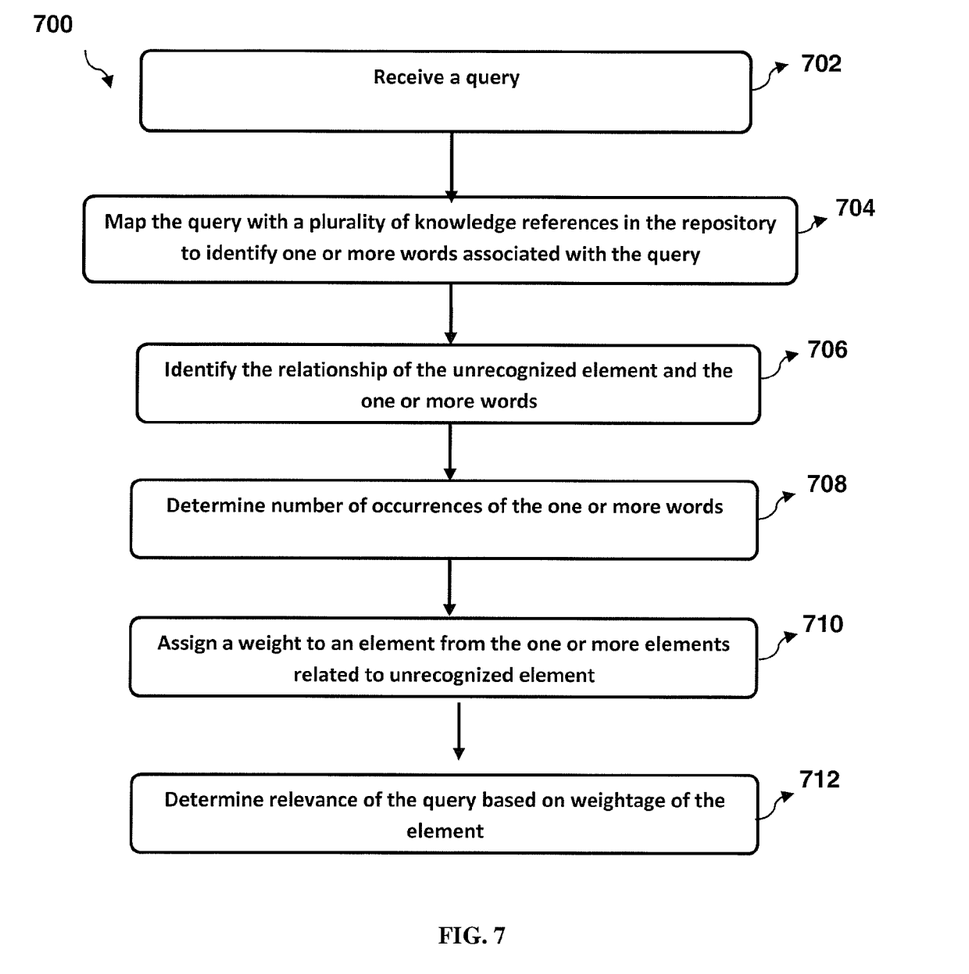
FIG. 7 illustrates a method for identifying a relationship of an unrecognized element with respect to a query in a repository, in accordance with an embodiment of the present disclosure.

Referring now to FIG. 7, a method 700 for identifying a relationship of an unrecognized element with respect to a query in a repository is shown, in accordance with an embodiment of the present disclosure. The method 700 may be described in the general context of computer executable instructions. Generally, computer executable instructions can include routines, programs, objects, components, data structures, procedures, modules, functions, etc., that perform particular functions or implement particular abstract data types. The method 700 may also be practiced in a distributed computing environment where functions may be performed by remote processing devices that may be linked through a communications network. In a distributed computing environment, computer executable instructions may be located in both local and remote computer storage media, including memory storage devices.

The order in which the method 700 is described and is not intended to be construed as a limitation, and any number of the described method blocks can be combined in any order to implement the method 700 or alternate methods. Additionally, individual blocks may be deleted from the method 700 without departing from the spirit and scope of the disclosure described herein. Furthermore, the method can be implemented in any suitable hardware, software, firmware, or combination thereof. However, for ease of explanation, in the embodiments described below, the method 700 may be implemented in the above-described system 102.

At block 702, a query may be received from the user through the user interface 204 of the system 102. The reception module 210 may receive the query. The query may comprise at lease one of a recognized element or an unrecognized element in the repository. The query may comprise one or more elements, which includes but not limited to phrase, sentence data definition. In one embodiment, the query may comprise at least one of the recognized element or at least one the unrecognized element or combination of both that may be present in the repository.

At block 704, the query may be mapped with plurality of knowledge references in the repository to identify a multitude of words associated with the query by the mapping module 212. The plurality of knowledge references may include, but not limited to, word dictionaries, system specific dictionaries to locate the recognized elements or the unrecognized elements in the repository. The multitude of words may comprise a data definition, or a sentence, or a phrase, or a document in the repository. In one embodiment, the multitude of words may comprise one or more elements related to the unrecognized element of the query.

At block 706, relationship of the unrecognized element and the multitude of words may be identified using the mapping module 212. The mapping module 212 derives the relationship using a parent and sibling relationship.

At block 708, the mapping module 212 may determine the number of occurrences of the one or more elements related to the unrecognized element with respect to the query. In one embodiment, siblings of the query elements may be identified. The siblings may be defined as possible matches found for the query at the level specified by the user. The number of occurrences of the one or more elements related to the unrecognized element with respect to the query may be determined by deriving relationship of the identified possible matched siblings in the repository. The relationship of the identified possible matched siblings may further be subjected to extensive search based on the linked objects, parents/child relationships, reference elements.

At block 710, a weightage may be assigned to an element from the one or more elements related to the unrecognized element based upon the number of occurrences by the assigning module 214. The assigning module 214 may be configured to assign the weightage to the element from the one or more elements related to the unrecognized element based upon the number of occurrences. At block 712, the relevancy of the query may be determined based on the weightage of the element by the assigning module 214. The relevancy of the query may be determined using a mathematical derivation/probability determination based on the weightage assigned to the element.

The system 102 may be implemented to retrieve one or more elements from a library comprising one or more classifications of books and one or more authors associated with each of the books. For example, an administrator or the user may define the query to retrieve the relevant book associated with the query element from the repository. Further, the system 102 may be implemented to retrieve documents in a markup language, such as HTML. Although implementations of system and method for identifying a relationship of an unrecognized element with respect to a query in a repository have been described in language specific to structural features and/or methods, it is to be understood that the appended claims are not necessarily limited to the specific features or methods described. Rather, the specific features and methods are disclosed as examples of implementations for identifying a relationship of an unrecognized element with respect to a query in a repository.

We claim:

1. A method for identifying a relationship of an unrecognized element with respect to a query in a repository, comprising:
   receiving a query comprising at least one unrecognized element in a repository, wherein the unrecognized element comprises at the least one of: a data definition, a sentence, phrase, a semantic unit, or an electronic document;
   mapping, by one or more hardware processors, the query with a plurality of knowledge references in the repository to identify one or more words comprising one or more elements related to the unrecognized element of the query;
   identifying, by the one or more hardware processors, a relationship of the unrecognized element and the words, wherein the relationship is derived by determining parent and child relationships of one or more siblings in the repository, and wherein the one or more siblings refer to the one or more elements having possible match to the unrecognized element of the query;
   determining, by the one or more hardware processors, a number of occurrences of all parent elements and child elements from the parent and child relationships related to the unrecognized element in the repository;
   assigning, by the one or more hardware processors, a weight to all the parent elements and the child elements based upon the number of occurrences; and
   determining, by the one or more hardware processors, a relevance of the query in the repository using the weight assigned to the parent elements and child elements.

2. The method of claim 1, wherein the plurality of knowledge references includes a lexicon.

3. The method of claim 1, wherein the plurality of knowledge references comprises at least one of: word dictionaries, repository specific dictionaries, history of the query, reference words of a domain, or reference words of a geography.

4. The method of claim 1, the method further comprises: retrieving the one or more elements in a hierarchical manner based on the relevance of the query.

5. The method of claim 1, wherein assigning comprises: calculating a frequency of occurrences of all the parent elements and the child elements related to the unrecognized element in the repository in a descending order.

6. The method of claim 1, wherein the assigning weight is directly proportional to the number of occurrences of the element in the repository.

7. A system for identifying a relationship of an unrecognized element with respect to a query in a repository, the system comprising:
   one or more hardware processors;
   one or more memory units coupled to the one or more hardware processors, wherein the one or more hardware processors execute a plurality of modules stored in the one or more memory units, the plurality of modules comprising:
      a reception module to receive a query comprising at least one unrecognized element in a repository, wherein the unrecognized element comprises at least one of: a data definition, a sentence, phrase, a semantic unit, or an electronic document;
      a mapping module to:
      map the query with a plurality of knowledge references in the repository to identify one or more words comprising one or more elements related to the unrecognized element of the query,
      identify a relationship of the unrecognized element and the one or more words, wherein the relationship is derived by determining the parent and child relationship of one or more siblings in the repository, and wherein the one or more siblings refer to the one or more elements having possible match to the unrecognized element of the query, and
      determine a number of occurrences of all parent elements and child elements from the parent and child relationships related to the unrecognized element in the repository;
      an assigning module configured to:
         assign a weight to all the parent elements and the child elements based upon the number of occurrences, and determine a relevance of the query in the repository using the weight assigned to the parent elements and child elements; and a retrieving module to retrieve the one or more elements in a hierarchical manner based on the relevance.

8. The system of claim 7, wherein the plurality of knowledge references includes a lexicon.

9. The system of claim 7, wherein the plurality of knowledge references comprises at least one of: word dictionaries, repository specific dictionaries, history of the query, reference words of a domain, or reference words of geography.

10. The system of claim 7, wherein the assigning module calculates a frequency of occurrences of all the parent elements and the child elements related to the unrecognized element in the repository in a descending order.

11. A non-transitory computer readable medium embodying a program executable in a computing device for identifying a relationship of an unrecognized element with respect to a query in a repository, the program comprising:

a program code for receiving a query comprising at least one unrecognized element in a repository, wherein the unrecognized element comprises at least one of: a data definition, a sentence, phrase, a semantic unit, or an electronic document;

a program code for mapping the query with a plurality of knowledge references in the repository to identify one or more words comprising one or more elements related to the unrecognized element of the query;

a program code for identifying a relationship of the unrecognized element and the words, wherein the relationship is derived by determining the parent and child relationships of one or more siblings in the repository, and wherein the one or more sibling refer to the one or more elements having possible match to the unrecognized element of the query;

a program code for determining a number of occurrences of all parent elements and child elements from the parent and child relationship related to the unrecognized element in the repository;

a program code for assigning a weight to all the parent elements and the child elements based upon the number of occurrences; and a program code for determining a relevance of the query in the repository using the weightage assigned to the parent elements and child elements.

\* \* \* \* \*